United States Patent
Ruppert

(10) Patent No.: US 12,525,843 B2
(45) Date of Patent: Jan. 13, 2026

(54) POWER ELECTRONICS MODULE HAVING A SEALING SHEATHING ATTACHED VIA AN ADHESION AGENT, ELECTRICAL DRIVE MACHINE AND PRODUCTION METHOD

(71) Applicant: Schaeffler Technologies AG & Co. KG, Herzogenaurach (DE)

(72) Inventor: Andreas Ruppert, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 278 days.

(21) Appl. No.: 17/641,242

(22) PCT Filed: Aug. 25, 2020

(86) PCT No.: PCT/DE2020/100744
§ 371 (c)(1),
(2) Date: Mar. 8, 2022

(87) PCT Pub. No.: WO2021/047722
PCT Pub. Date: Mar. 18, 2021

(65) Prior Publication Data
US 2022/0329126 A1    Oct. 13, 2022

(30) Foreign Application Priority Data
Sep. 10, 2019    (DE) .................... 10 2019 124 229.0

(51) Int. Cl.
*H02K 5/22*    (2006.01)
*H02K 5/10*    (2006.01)
(Continued)

(52) U.S. Cl.
CPC ............... *H02K 5/225* (2013.01); *H02K 5/10* (2013.01); *H02K 11/00* (2013.01); *H05K 7/14329* (2022.08)

(58) Field of Classification Search
CPC .. H02K 1/04; H02K 1/06; H02K 1/14; H02K 1/16; H02K 1/18; H02K 1/20; H02K 3/04;
(Continued)

(56) References Cited

U.S. PATENT DOCUMENTS 2,667,462 A    1/1954    Wildish et al.
5,912,433 A    6/1999    Pulido
(Continued)

FOREIGN PATENT DOCUMENTS

CA    2546697 A1 *    5/2005    ............ H01M 10/02
CN    107342646 A *    11/2017    ............ H02K 15/00
(Continued)

OTHER PUBLICATIONS

CN107342646A_Translation (Year: 2023).*
(Continued)

*Primary Examiner* — Christopher M Koehler
*Assistant Examiner* — Ahmed F Seck
(74) *Attorney, Agent, or Firm* — Volpe Koenig

(57) ABSTRACT

A power electronics module for an electrical drive machine of a motor vehicle includes multiple bus bars and a potting element supporting the bus bars such that they are spaced apart and electrically insulated from one another. Each bus bar is exposed in a first connection region and a second connection region, opposite the first connection region, for further contact with the environment of the potting element. The bus bars are provided with a sealing sheathing, applied separately to the potting element, on a longitudinal section between the two connection regions arranged in a common recess in the potting element made from a plastic material. The sealing sheathing is adhered to the bus bar via a layer of adhesion agent. An electrical drive machine comprising
(Continued)

said power electronics module, as well as a method of a power electronics module is provided.

11 Claims, 4 Drawing Sheets

(51) Int. Cl.
*H02K 11/00* (2016.01)
*H05K 7/14* (2006.01)

(58) Field of Classification Search
CPC .. H02K 3/14; H02K 3/18; H02K 3/24; H02K 3/28; H02K 3/30; H02K 3/32; H02K 3/34; H02K 3/38; H02K 3/50; H02K 3/52; H02K 5/08; H02K 5/10; H02K 5/20; H02K 5/203; H02K 9/04; H02K 9/19; H02K 9/193; H02K 9/197; H02K 9/26; H02K 11/02; H02K 11/026; H02K 13/52; H02K 13/74; H02K 13/405; H02K 13/521; H02K 13/533; H02K 5/04; H02K 5/132; H02K 5/02; H02K 5/225; H05K 7/14329

See application file for complete search history.

(56) References Cited

U.S. PATENT DOCUMENTS

| | | | | |
|---|---|---|---|---|
| 10,717,401 B2* | 7/2020 | Skalski | .................... | H02K 5/10 |
| 2007/0097596 A1* | 5/2007 | Kuwajima | .............. | H01G 4/01 |
| | | | | 361/311 |
| 2011/0316373 A1* | 12/2011 | Kobayashi | ........... | H01R 13/521 |
| | | | | 310/71 |
| 2018/0304835 A1* | 10/2018 | Skalski | .................. | H02K 11/33 |
| 2019/0074147 A1* | 3/2019 | Reichert | ................ | H01H 9/541 |
| 2019/0157941 A1 | 5/2019 | Makino | | |
| 2020/0266680 A1* | 8/2020 | Fujimoto | ............... | H02K 5/225 |

FOREIGN PATENT DOCUMENTS

| | | | | |
|---|---|---|---|---|
| CN | 109983854 A | * | 7/2019 | ............... H05K 5/00 |
| CN | 110034449 A | | 7/2019 | |
| DE | 588229 C | | 11/1933 | |
| DE | 37263571 A1 | | 2/1989 | |
| DE | 102008061185 A1 | | 3/2010 | |
| DE | 102015213439 A1 | | 1/2017 | |
| DE | 102016223167 A1 | | 5/2018 | |
| DE | 102018109407 A1 | | 10/2018 | |
| EP | 2667462 A1 | | 11/2013 | |
| JP | 2002280090 A | * | 9/2002 | |
| WO | WO-2019131422 A1 | * | 7/2019 | ............. H02K 11/30 |

OTHER PUBLICATIONS

CN109983854A—Translation (Year: 2024).*
CA2546697A1—Translation (Year: 2024).*
U.S. Appl. No. 17/641,242, filed Nov. 25, 2024_WO_2019131422_A1_H.pdf (Year: 2024).*
U.S. Appl. No. 17/641,242, filed May 17, 2025_JP_2002280090_A_H.pdf (Year: 2025).*

* cited by examiner

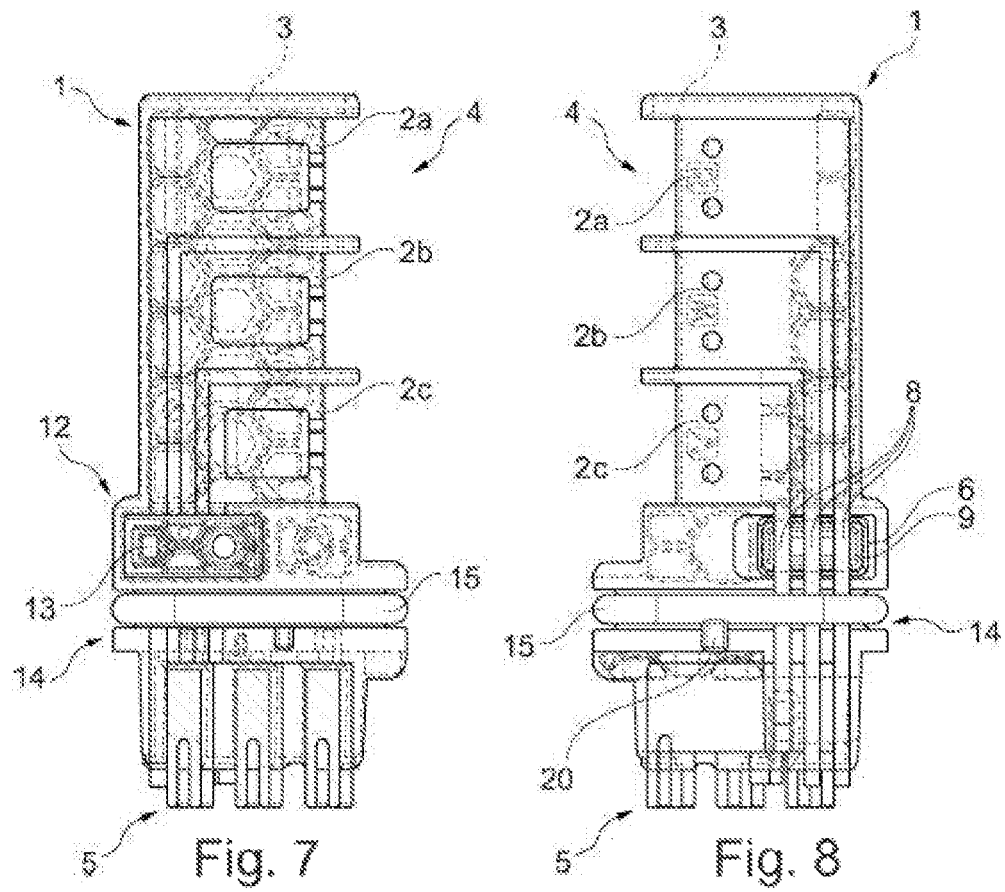
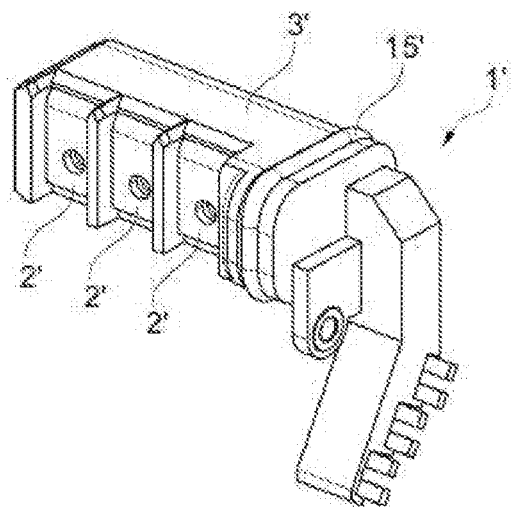
Prior Art
Fig. 9

POWER ELECTRONICS MODULE HAVING A SEALING SHEATHING ATTACHED VIA AN ADHESION AGENT, ELECTRICAL DRIVE MACHINE AND PRODUCTION METHOD

CROSS-REFERENCE TO RELATED APPLICATIONS

This application is the U.S. National Phase of PCT Appln. No. PCT/DE2020/100744 filed Aug. 25, 2020, which claims priority to DE 102019124229.0 filed Sep. 10, 2019, the entire disclosures of which are incorporated by reference herein.

TECHNICAL FIELD

The disclosure relates to a power electronics module for an electrical drive machine of a purely electrical or hybrid motor vehicle, such as a car, truck, bus or other commercial vehicle, comprising multiple bus bars and a potting element supporting the bus bars such that they are spaced apart and electrically insulated from one another, wherein each bus bar is exposed in a first connection region and a second connection region, which is opposite the first connection region, for further contact with the environment of the potting element. Furthermore, the disclosure relates to an electrical drive machine comprising said power electronics module as well as a method for manufacturing this power electronics module.

BACKGROUND

A power electronics module 1' known in principle from the prior art is shown in FIG. 9. This power electronics module 1' has several bus bars 2' arranged in a potting element 3' and enclosed by this potting element 3'. In its installed state on the drive machine side, the power electronics module 1' is arranged with one part in a dry space and with another part in a wet space, sealed off from the dry space, of a housing of the electrical drive machine. To seal the wet space from the dry space, a circumferential seal 15' is arranged on the potting element 3' in a gap area between a receiving hole of the housing and an outer side of the potting element 3'.

However, a disadvantage of these designs known from the prior art has turned out to be that, despite the seal arranged on the outer side, a liquid from the wet space can penetrate into the interior of the power electronics module over a certain period of operation. Due to the prevailing capillary forces, liquid constantly enters the gaps between the bus bars and the potting element. This results in liquid even being able to enter the dry space after penetrating the power electronics module. This effect is amplified by the highly fluctuating ambient temperatures, since bus bars and potting elements have different coefficients of thermal expansion.

SUMMARY

It is therefore the object of the present disclosure to remedy the disadvantages known from the prior art and, in particular, to provide a power electronics module that can be used between a dry space and a wet space of an electrical drive machine that provides a more reliable seal of these spaces over the life of the electrical drive machine.

According to the disclosure, this object is achieved by providing the bus bars with a sealing sheathing, applied separately to the potting element, on a longitudinal section between the two connection regions arranged in a common recess in the potting element made from a (first) plastic material, with said sealing sheathing being adhered to the bus bar via a layer of adhesion agent.

This provides an internal seal within the power electronics module in a compact and easy-to-manufacture manner that, in operation, prevents transfer of a liquid transported by capillary forces from a wet space to a dry space of the electrical drive machine. The power electronics module is thus designed to implement a more durable electrical drive machine.

Further advantageous embodiments are explained in more detail below.

Accordingly, it is further advantageous if the bus bars are surface-activated in the longitudinal section surrounded by the layer of adhesion agent. This further increases the adhesive force between the sealing sheathing/layer of adhesion agent and the bus bar.

It is also advantageous if three bus bars are provided, each with its longitudinal section arranged within the recess (and further coupled to the sealing sheathing in the usual manner via a layer of adhesion agent). This allows a compact design of the power electronics module.

If the recess is designed as a through hole penetrating the potting element, it is particularly easy to manufacture using conventional casting methods, preferably injection molding.

Furthermore, it is advantageous if the through hole is closed by a cover at its end region spaced apart from the bus bars. This further simplifies the manufacture of the sealing sheathing.

Thus, it is particularly advantageous if the sealing sheathing is directly implemented as a filling (consisting of a second plastic material) cast into the recess.

In addition, it is convenient if a seal extending around the potting element is received on an outer side of the potting element, on a side of the recess facing the second connection regions. This results in a space-saving relative arrangement between the inner seal and the outer seal.

Furthermore, the disclosure relates to an electrical drive machine for a motor vehicle, having a housing, wherein the housing has a wet space accommodating a stator and a dry space sealed relative to the wet space, and having a power electronics module according to the disclosure according to at least one of the embodiments described above, wherein the first connection regions of the bus bars are arranged in the dry space and the second connection regions of the bus bars, which are further connected to windings of the stator, are arranged in the wet space.

In addition, the disclosure relates to a method for producing a power electronics module for an electrical drive machine of a motor vehicle, wherein, in a first step, multiple bus bars are encapsulated by a first plastic material (preferably in an injection molding process) in such a way that the bus bars are held spaced apart and electrically insulated from one another after the curing of the first plastic material forming a potting element and are each arranged with a longitudinal section within a recess of the potting element which is exposed to the environment, in a second step (after step a), i.e. after complete curing of the potting element, a layer of adhesion agent is applied to the longitudinal section of each bus bar, and in a third step, a second plastic material is filled into the recess so that the second plastic material, after curing, adheres to the longitudinal section of each bus bar as a sealing sheathing via the layer of adhesion agent.

In other words, according to the disclosure, the oil-tightness of a high-voltage component is ensured. In addition to an ordinary (external) seal between the power electronics (power electronics module) and the e-drive/electrical drive (electrical drive machine), a small chamber (recess) is cast into the plastic housing (potting element), through which chamber the copper bus bars (bus bars) run between the electric motor (stator) and the electronics. The copper bars are treated with an adhesion agent (primer) to increase their adhesion. The chamber is then filled with a cast component sealing sheathing.

BRIEF DESCRIPTION OF THE DRAWINGS

In the following, the disclosure is now explained in more detail with reference to figures.

In the figures:

FIG. 7 shows a partially transparent view of the power electronics module shown from the underside according to FIG. 5, FIG. 8 shows a partially transparent view of the power electronics module shown from the top side according to FIG. 1, and FIG. 9 shows a perspective view of a power electronics module known from the prior art.

The figures are only schematic in nature and serve only for understanding the disclosure. The same elements are provided with the same reference signs.

DETAILED DESCRIPTION

A power electronics module 1 according to the disclosure can be clearly seen in a stand-alone representation in FIGS. 1, 3, 5, 7 and 8. In its preferred field of application, the power electronics module 1, as can be seen further in FIG. 4, is used in an electrical drive machine 10 of a motor vehicle.

The electrical drive machine 10 is implemented in the usual manner as an electric motor having a stator 17 and a rotor, which is not shown further here for the sake of clarity. The electrical drive machine 10 is preferably used to drive a hybrid motor vehicle, and further preferably to drive a purely electrically driven motor vehicle. The electrical drive machine 10 is thus preferably integrated in a hybrid module (drive module with clutches) or an e-axle (electrical drive axle unit).

Figure 4:
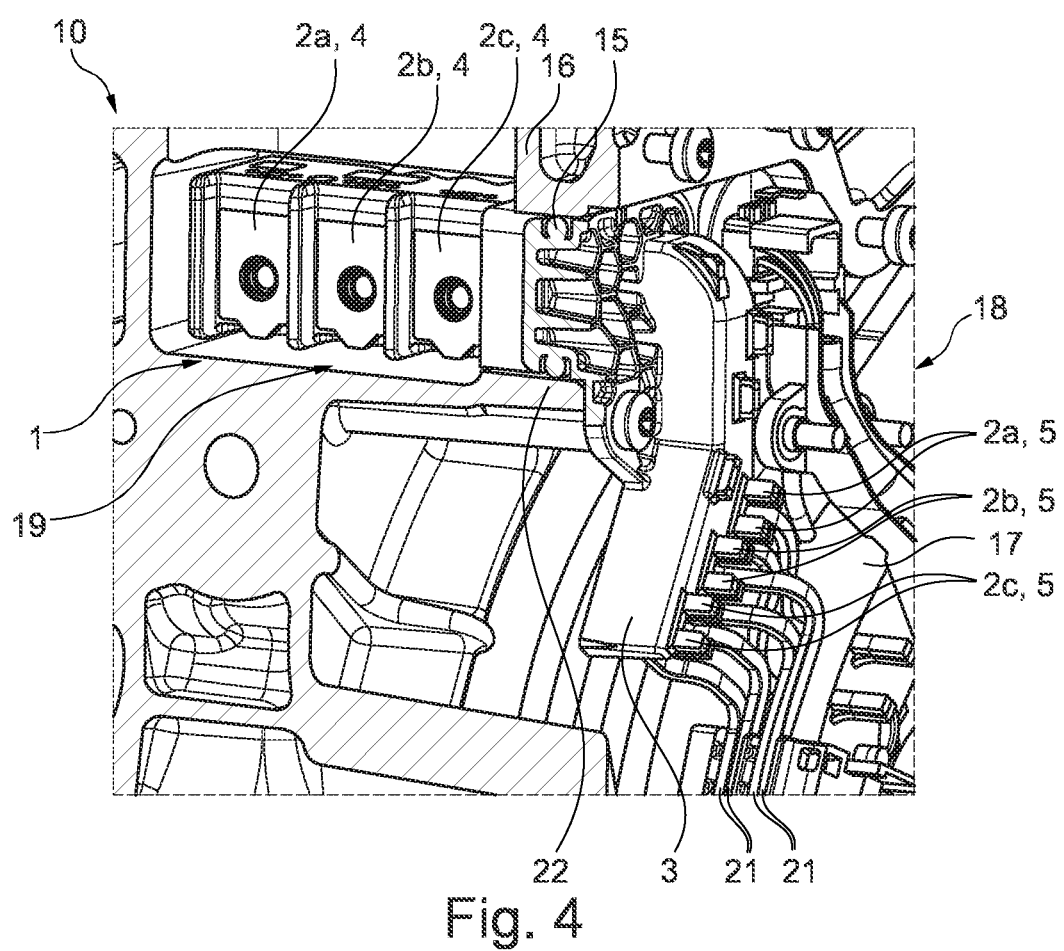
FIG. 4 shows a perspective view of a partially sectioned electrical drive machine with the power electronics module according to the disclosure as shown in FIGS. 1 to 3, wherein a dry space sealed relative to a wet space is easily visible adjacent to the wet space.

As can also be seen in FIG. 4, the electrical drive machine 10 is directly liquid-cooled by its stator 17. Accordingly, the electrical drive machine 10 has a wet space 18 accommodating the stator 17 and a dry space 19 sealed off relative to this wet space 18. The wet space 18 and dry space 19 form partial spaces within a common housing 16 of the electrical drive machine 10. The dry space 19 then typically contains other electronic components that are not surrounded by a cooling fluid flowing through the wet space 18 during operation. The power electronics module 1 according to the disclosure is now formed as a connecting link between the windings 21 of the stator 17 and the electronic components, which are not shown in more detail for the sake of clarity.

Figure 3:
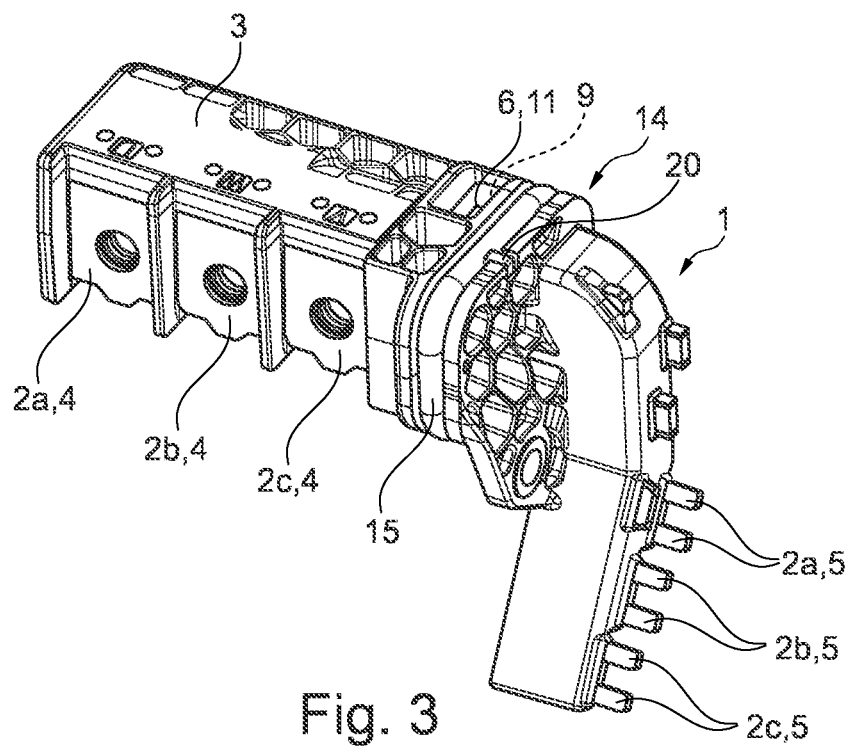
FIG. 3 shows a perspective view of the entire power electronics module according to FIG. 1.

The further principle design of the power electronics module 1 can be seen particularly well in FIG. 3. The power electronics module 1 has a potting element 3 designed as a plastic housing that can be seen from the outside. The potting element 3 is injection molded around several, in this case three, bus bars 2a, 2b, 2c in the form of a plastic sheathing and then cured so that it receives the bus bars 2a, 2b, 2c, which are spaced apart and electrically insulated from one another. Each bus bar 2a, 2b, 2c is exposed to the environment of the power electronics module 1 on the side of a first connection region 4 in the dry space 19. A second connection region 5 of the respective bus bar 2a, 2b, 2c opposite the respective first connection region 4 is exposed to the region of the potting element 3 arranged in the wet space 18 and further connected to the windings 21 of the stator 17. Between the connection regions 4, 5, each bus bar 2a, 2b, 2c is completely encased in plastic material.

A seal 15 is arranged between the two connection regions 4, 5 on an outer side 14 of the potting element 3 in an annular groove. This seal 15, acting as an outer seal of the power electronics module 1, is used directly to seal a gap 22 formed between the housing 16 of the electrical drive machine 10 and the potting element 3 (FIG. 4). As can be seen, this seal 15 is designed with a substantially circular cross-section in the sense of an O-ring. In addition, the seal 15 has an anti-rotation lug 20 in a circumferential region, which is received in the potting element 3 in a form-fitting manner. Thus, a reliable sealing of the dry space 19 relative to the wet space 18 by the power electronics module 1 is achieved.

Figure 2:
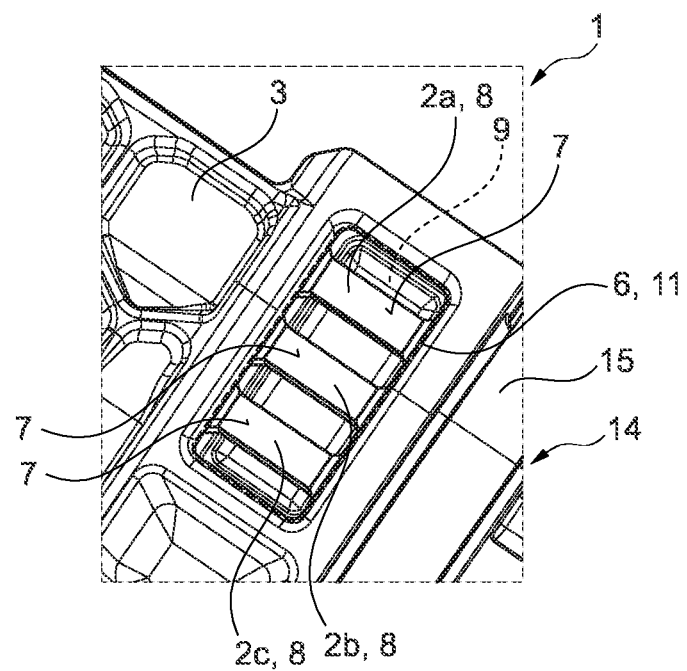
FIG. 2 shows a detailed perspective view of the recess receiving the sealing sheathing (shown transparently) from the outside.

In order to optimize the internal tightness of the power electronics module 1, a sealing sheathing 9 is implemented in a recess 6 of the potting element 3 according to the disclosure. As can be seen in detail in this regard first in FIG. 2, the bus bars 2a, 2b, 2c are surrounded by this sealing sheathing 9 in a restricted longitudinal section 8 between each first and second connection region 4, 5. The sealing sheathing 9 is realized as a separately manufactured/cast (second) plastic material to the (first) plastic material of the potting element 3. During manufacture, a recess 6 in the form of a through hole 11 is initially kept free in a first step during casting of the potting element 3, through which recess 6 the bus bars 2a, 2b, 2c extend with their longitudinal section 8.

Figure 5:
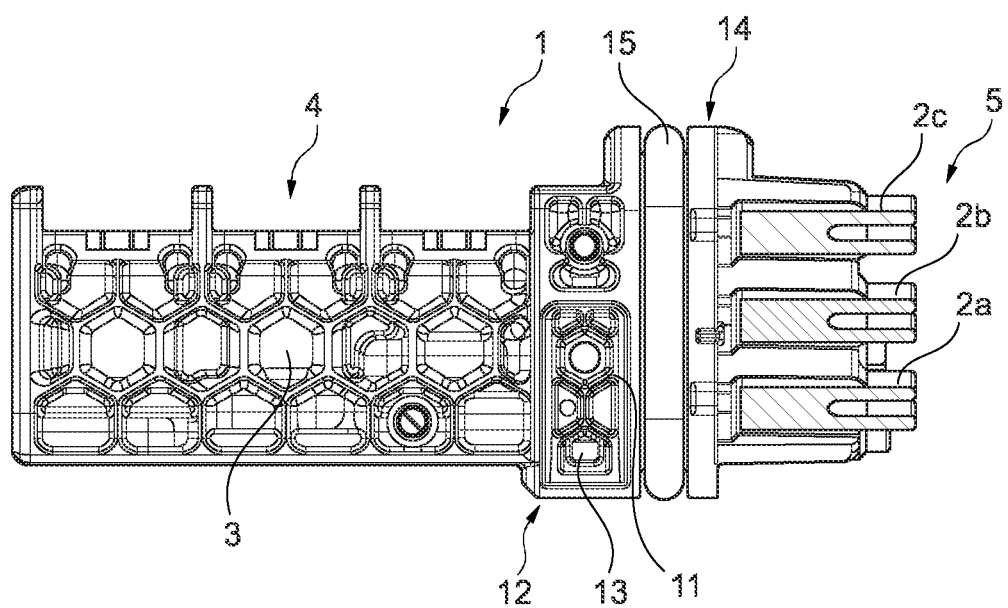
FIG. 5 shows a bottom view of the power electronics module according to FIG. 1, wherein a cover closing the recess towards an underside can be seen.
Figure 6:
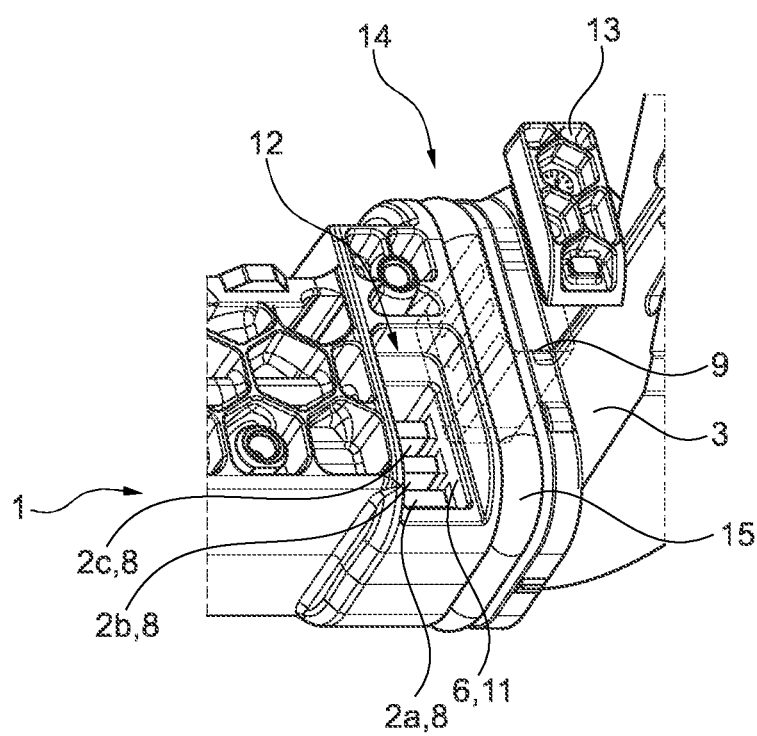
FIG. 6 shows a detailed perspective view of the underside already shown in FIG. 5 with an exploded view of the cover as well as the sealing sheathing of the rest of the potting element.

According to the disclosure, the sealing sheathing 9 is attached to the longitudinal section 8 via a layer of adhesion agent 7 on the outer surface of the respective bus bar 2a, 2b, 2c. In a second step of the production process according to the disclosure, a layer of adhesion agent 7 is thus applied to the respective longitudinal section 8 of the bus bars 2a, 2b, 2c. Previously, the surface of the longitudinal section 8 was preferably surface activated. Subsequently, in a third step, the second plastic material forming the sealing sheathing 9 in the cured state is filled into the recess 6 until the longitudinal sections 8 are completely surrounded by the sealing sheathing 9. As can be seen in FIGS. 5 and 6, a cover 13 is used on an underside of the potting element 3 to close off the recess 6. The cover 13 is positioned at an end region 12 of the recess 6 spaced apart from the bus bars 2a, 2b, 2c. Thus, the sealing sheathing 9 is implemented as an internal seal of the power electronics module 1.

Furthermore, as shown in FIGS. 7 and 8, the individual bus bars 2a, 2b, 2c extend between their connection regions 4, 5 completely insulated from one another throughout within the potting element 3. While each first connection region 4 is formed as a connector receptacle, each second connection region 5 is provided with two pins. The first bus bar 2a is substantially parallel to the second bus bar 2b; the third bus bar 2c is substantially parallel to both the first bus bar 2a and the third bus bar 2c.

In other words, in the present application, a high-voltage terminal (power electronics module 1) is used to contact two interfaces. One interface is to the power electronics, the other to the e-machine 10. The region of the power electronics is also called the "dry space" and the region of the e-machine 10 the "wet space", as this is actively cooled with an appropriate oil. Both spaces are sealed from the outside by a separate seal 15. The present system is a high-voltage terminal 1, which consists of copper bars 2a, 2b, 2c that are overmolded with an appropriate plastic.

The inventive solution is to use an additional potting (sealing sheathing 9) to generate an additional barrier for the oil seeping along. First, the bus bars 2a, 2b, 2c are treated with a so-called primer (layer of adhesion agent 7) to increase the adhesion of the potting compound 9 to the copper-plastic joint. In a further process step, the potting agent is filled in and cured under temperature. The 3-component-joint of potting, plastic and copper that has now been created is many times more oil-tight than the original system.

FIG. 3 clearly shows that an additional potting chamber 6 has now been introduced behind the seal 15 in the dry space 19. This potting chamber 6 is used as described above to generate a barrier to the oil seeping along.

Figure 1:
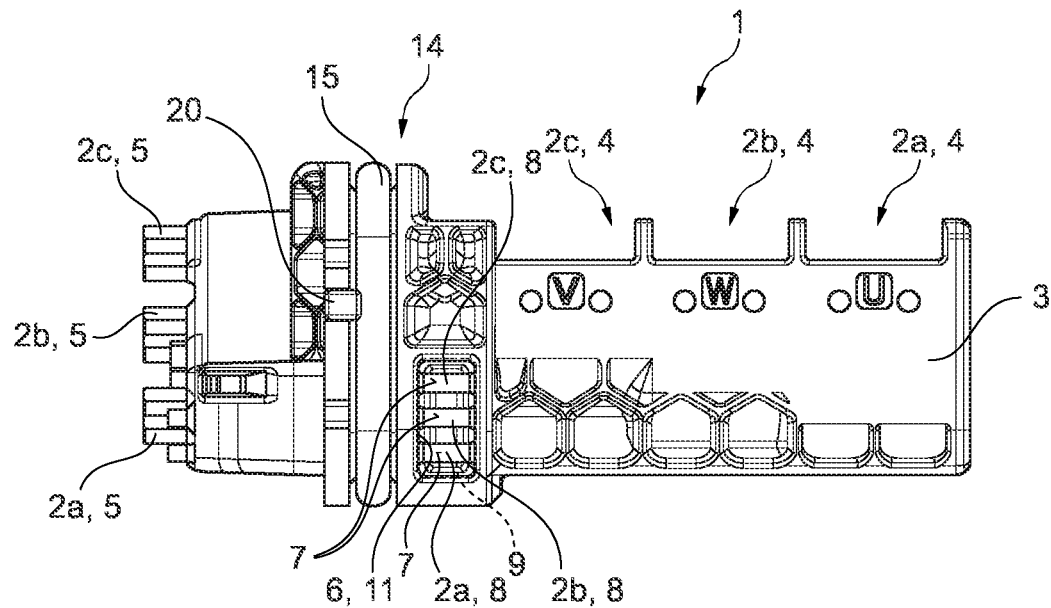
FIG. 1 shows a side view of a power electronics module according to the disclosure according to a preferred embodiment, wherein a recess can be seen next to an outer seal received on an outer side of a potting element, within which a sealing sheathing surrounding several bus bars is shown transparently.

In the front view/top view according to FIG. 1, the HV terminal 1 is shown from above. Here, the three bus bars 2a, 2b, 2c are visible. In the rear view/bottom view according to FIG. 5, it can be seen that the base is provided with an end cover 13. This is required so that the potting material does not escape during the potting process. Plastic and copper expand differently under temperature. The potting itself also has a different coefficient of expansion. By using the primer 7, an adhesive, the potting material 9 can form an adhesive bond with the copper 2a, 2b, 2c and the plastic 3. This generates sufficient tightness within the assembly.

The bus bars 2a, 2b, 2c are pre-bent accordingly and inserted into an injection molding tool and overmolded with a suitable material. In this case, as in FIG. 2, a region (potting area) is omitted accordingly to create an empty chamber 6. This empty chamber 6 is closed from one side with the separate cover 13. This leaves an opening that can be used accordingly for the filling process.

FIG. 4 shows the installation state in the overall system. The sealing interface to the housing 16 is clearly visible. FIGS. 6 to 8 illustrate further representations, such as a transparent view to make the course of the bus bars 2a, 2b, 2c more visible, and an exploded view.

LIST OF REFERENCE NUMERALS

1 Power electronics module
2a First bus bar
2b Second bus bar
2c Third bus bar
3 Potting element
4 First connection region
5 Second connection region
6 Recess
7 Layer of adhesion agent
8 Longitudinal section
9 Sealing sheathing
10 Electrical drive machine
11 Through hole
12 End region
13 Cover
14 Outer side
15 Seal
16 Housing
17 Stator
18 Wet space
19 Dry space
20 Anti-rotation lug
21 Winding
22 Gap

The invention claimed is:

1. A power electronics module for an electrical drive machine of a motor vehicle, the power electronics module comprising:
   multiple bus bars and a potting element supporting the bus bars such that the bus bars are spaced apart and electrically insulated from one another,
   wherein each bus bar is exposed in a first connection region and a second connection region, opposite the first connection region, for further contact with an environment of the potting element,
   wherein the bus bars are provided with a sealing sheathing, applied separately to the potting element, on a longitudinal section between the first and second connection regions, each of the bus bars are arranged in a singular common recess in the potting element made from a plastic material, and said sealing sheathing is adhered to the bus bar via a layer of adhesion agent, and
   wherein the longitudinal section of each bus bar is arranged within an interior of the singular common recess, wherein the recess is designed as a through hole penetrating the potting element and the through hole is closed off by a cover at its end region spaced apart and non-contacting the bus bars and the adhesion agent, the sealing sheathing and the cover being separate components.

2. The power electronics module according to claim 1, wherein the bus bars are surface-activated in the longitudinal section surrounded by the layer of adhesion agent.

3. The power electronics module according to claim 1, wherein three bus bars are provided.

4. The power electronics module according to claim 1, wherein a seal extending around the potting element is received on an outer side of the potting element, on a side of the recess facing the second connection regions.

5. An electrical drive machine for a motor vehicle, comprising:
   a housing, wherein the housing has a wet space accommodating a stator and a dry space sealed relative to the wet space, and having a power electronics module according to claim 1, wherein the first connection regions of the bus bars are arranged in the dry space and the second connection regions of the bus bars, which are further connected to windings of the stator, are arranged in the wet space.

6. A method for producing a power electronics module for an electrical drive machine of a motor vehicle, the method comprising:
   in a first step, encapsulating multiple bus bars by a first plastic material in such a way that the bus bars are held spaced apart and electrically insulated from one another after a curing of the first plastic material forming a potting element and are each arranged with a longitudinal section inside a singular common recess of the potting element which is exposed to an environment,
   in a second step, surface activating a surface of the longitudinal section and then applying a layer of adhesion agent to the surface-activated longitudinal section of each bus bar, and
   in a third step, filling a second plastic material into the recess and then curing the second plastic material so that the second plastic material adheres to the surface-activated longitudinal section of each bus bar as a sealing sheathing via the layer of adhesion agent.

7. A power electronics module for an electrical drive machine of a motor vehicle, the power electronics module comprising:
   multiple bus bars and a potting element supporting the bus bars such that the bus bars are spaced apart and electrically insulated from one another;
   each bus bar is exposed in a first connection region and a second connection region, opposite the first connection region, for further contact with an environment of the potting element;
   the bus bars are provided with a sealing sheathing, applied separately to the potting element, on a longitudinal section between the first and second connection regions arranged in a singular common recess in the potting element made from a plastic material, with said sealing sheathing being adhered to the bus bar via surface activation of the bus bar and then a layer of adhesion agent on the surface-activated bus bar, and
   a seal extends around the potting element and is received in an annular groove on an exterior surface of the potting element, on a side of the recess facing the second connection regions such that the seal is separated from the sealing sheathing by a portion of the potting element.

8. The power electronics module according to claim 7, wherein the seal is oriented to be non-contacting with the sealing sheathing.

9. The power electronics module according to claim 7, wherein the seal includes an anti-rotation lug.

10. The power electronics module according to claim 9, wherein the anti-rotation lug is in a circumferential region of the seal.

11. The power electronics module according to claim 10, wherein the anti-rotation lug is configured to be received in the potting element in a form-fitting manner.

* * * * *